Dec. 20, 1966  R. P. ROETTER  3,293,065
METHOD OF COATING GLASS FOR SUBSEQUENT SOLDERING
Filed March 29, 1965  3 Sheets-Sheet 1
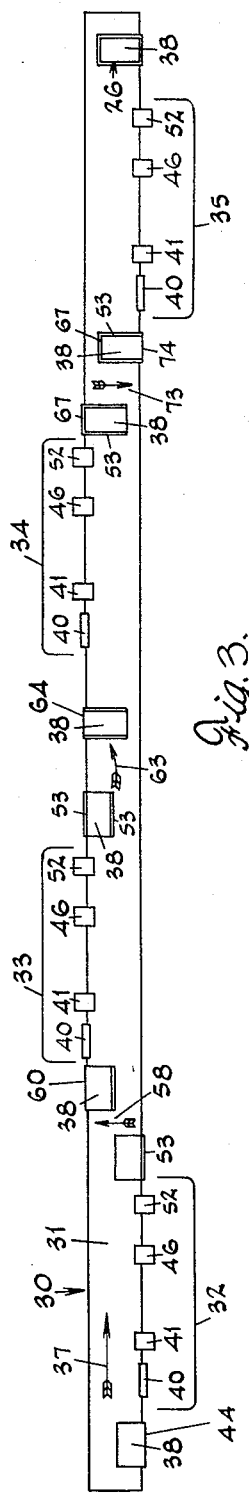
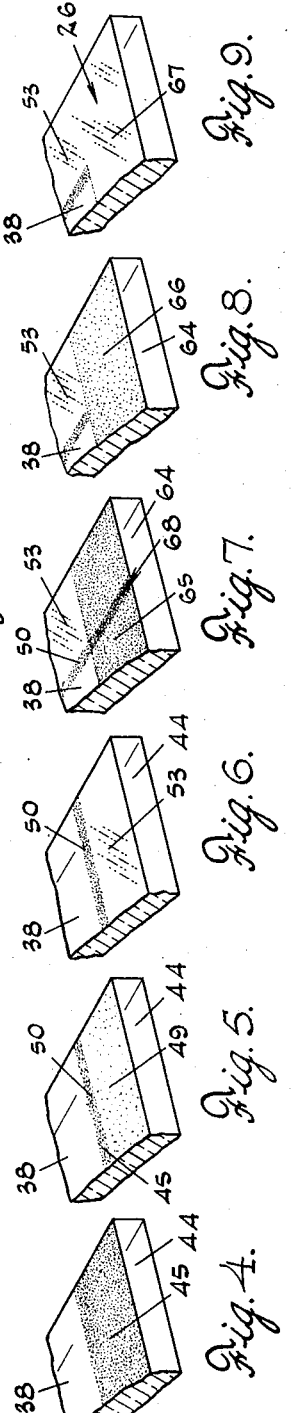
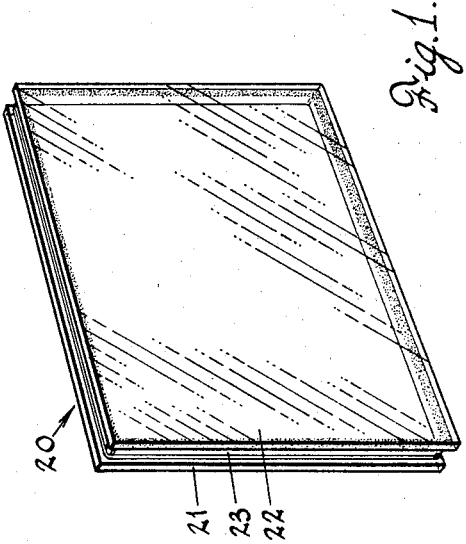
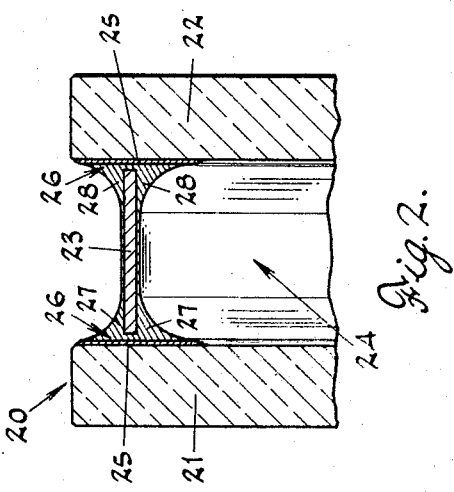
INVENTOR.
Robert P. Roetter
BY
Nobbe & Swope
ATTORNEYS Dec. 20, 1966 R. P. ROETTER 3,293,065
METHOD OF COATING GLASS FOR SUBSEQUENT SOLDERING
Filed March 29, 1965 3 Sheets-Sheet 2
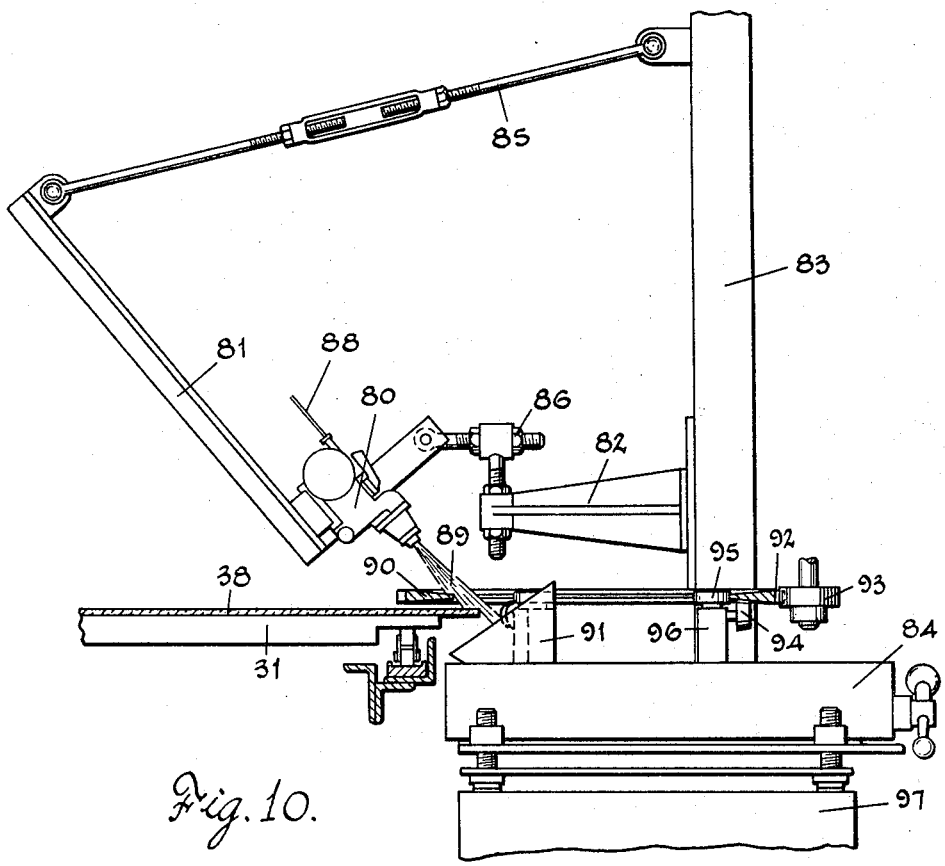
Fig. 10.
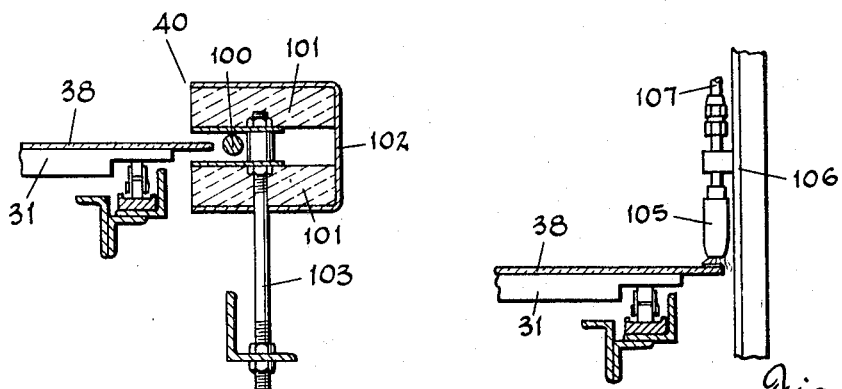
Fig. 11.
Fig. 12.
INVENTOR.
Robert P. Roetter
BY
Nobbe & Swope
ATTORNEYS Dec. 20, 1966  R. P. ROETTER  3,293,065
METHOD OF COATING GLASS FOR SUBSEQUENT SOLDERING
Filed March 29, 1965  3 Sheets-Sheet 3

INVENTOR.
Robert P. Roetter
BY
Nobbe & Swope
ATTORNEYS

United States Patent Office 3,293,065
Patented Dec. 20, 1966

3,293,065
METHOD OF COATING GLASS FOR SUBSEQUENT SOLDERING
Robert P. Roetter, Perrysburg, Ohio, assignor to Libbey-Owens-Ford Glass Company, Toledo, Ohio, a corporation of Ohio
Filed Mar. 29, 1965, Ser. No. 445,854
3 Claims. (Cl. 117—46)

This application is a continuation-in-part of application Ser. No. 137,840, filed Sept. 13, 1961, now abandoned.

The present invention relates broadly to an improved method of coating glass for subsequent soldering operations and is of particular utility in the fabrication of multiple sheet glass glazing units of the so-called metal-to-glass type disclosed in the patent to Haven et al., No. 2,235,680, issued Mar. 18, 1941.

The multiple glass sheet glazing unit disclosed in the above patent comprises two sheets of glass secured together in spaced parallel relation by a metal separator soldered to metallic coatings on the glass sheets. In applying the metallic coatings, the marginal edge portions of the glass sheets are first heated to the required temperature and a copper alloy or other metal sprayed thereon to provide a base coat of the desired width and thickness. To this base coat is then applied a coating of solder to which the metal separator is soldered to secure the glass sheets together in spaced relation and to hermetically seal the space between the sheets.

Heretofore, the solder coating has been applied to the copper base coat by first applying a flux to the base coat upon which spaced drops of solder were then deposited after which the drops of solder were ironed out to form a continuous layer of solder. This method of tinning the copper base coat, as disclosed in the patent of Wampler et al., No. 2,938,494, issued May 31, 1960, has, however, been found to be relatively slow and cumbersome. Also, the apparatus employed for this purpose practically doubles the required work area and the number of operators required. Moreover, even though the solder coatings thus produced are known to be entirely satisfactory, the required additional handling of the glass sheets between operations and the amounts of materials and other supplies has been materially reduced when the solder coatings are produced in accordance with the method of this invention. Also, it has been found that even under the most careful methods of application small amounts of flux may become entrapped in the solder coating and eventually react to corrode the solder and even the copper base coat resulting in a deteriorating influence on the bond between the metal and glass.

The primary object of the present invention, therefore, is to provide an improved method of coating glass for subsequent soldering operations.

More particularly, it is an important object of the invention to provide. in the fabrication of multiple sheet glazing units, an improved method of coating the glass sheets for subsequent soldering to the metal separator, and especially in applying the coating of solder to the metallic base coat.

Another object of the invention is to provide such a method in which the solder coating is applied to the metallic base coat by a spraying operation and in which the use of a fluxing material is obviated.

Another object of the invention is to provide such a method in which a fine spray of solder is first applied at a relatively high temperature directly to the metallic base coat to form a relatively thin, dense layer after which a relatively heavier layer of solder is sprayed at a lower temperature directly upon the first layer.

A further object of the invention is to provide a method of the above character whereby a more rapid tinning of the metallic base coat can be achieved and in which the production costs of such tinning and attendant materials costs can be materially reduced.

Other objects and advantages of the invention will become more apparent during the course of the following description when taken in connection with the accompanying drawings.

In the drawings, wherein like numerals are employed to designate like parts throughout the same:

FIG. 1 is a perspective view of a multiple glass sheet glazing unit of the type produced by the method of this invention;

FIG. 2 is a cross-sectional detail view of the glazing unit;

FIG. 3 is a diagrammatic plan view of apparatus on which the method of this invention may be practiced;

FIGS. 4 to 9 are fragmentary perspective views of a glass sheet and in sequential relation the metallic coatings placed on the marginal edge portions of the sheet in accordance with the invention;

FIGS. 10 is a side elevation of a spray gun apparatus, parts thereof being shown in cross-section;

FIG. 11 is a vertical transverse detail view of an edge heating device;

FIG. 12 is an end elevation of a second type of heating device;

Figures 13, 14:
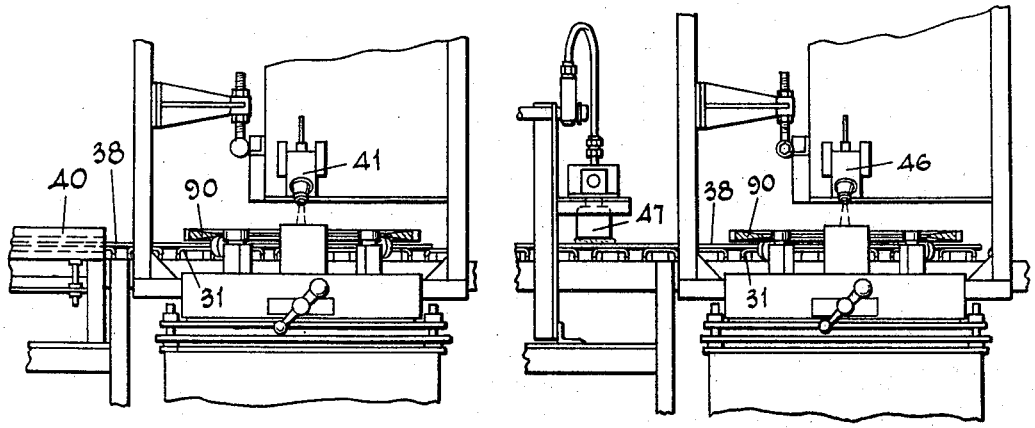
FIG. 13 is a front elevation of a metallizing spray gun assembly employed in the apparatus of FIG. 3.
FIG. 14 is a front elevation of a solder spray gun assembly.

With reference now to the drawings and particularly to FIGS. 1 and 2, there is shown a double glazing unit designated by the numeral 20 and comprising two sheets of glass 21 and 22 arranged in spaced parallel relation and secured together around their edges by a metal separator strip 23 to provide a hermetically sealed air space 24 therebetween.

In fabricating the unit, the marginal edge portions of one surface of each of the glass sheets 21 and 22 are provided with a metallic coating 25, preferably of a copper alloy, which may be of the composition disclosed in the Haven patent, No. 2,293,822, issued Aug. 25, 1942. The metal forming the base coat is also preferably sprayed on the glass sheets by use of the apparatus disclosed in the patent to Haven et al., No. 2,334,624, issued Nov. 16, 1943. A coating of solder 26 of the desired composition is then applied to the copper base coat 25. The separator strip 23, formed of lead or a lead alloy and suitably tinned with a deposit of solder, is then joined to the base coat 25 by use of a suitable heating means such as a soldering iron, to elevate the temperature of the solder coatings on the glass sheets and separator strip to produce fillets 27 and 28. As the solder coatings blend or amalgamate, the resulting single mass or volume of solder becomes permanently adherent to the separator strip and the copper base coat on the glass sheets and is shaped as a fillet for mechanical strength. Thus, as shown in FIG. 2, the marginal edge portions of glass sheets 21 and 22 are tightly secured and sealed to the respective edges of the separator strip 23 by the fillets 27 and 28 created from the solder coatings and permanently adhered to the copper base coat 25. Although the composition of the solder may be varied, a low-melting point solder having a wide plastic range with minimum plastic temperature is preferred.

The present invention is primarily concerned with an improved method of applying the coating of solder 26 to the copper, or other metallic, base coat 25 and which method may be carried out with the apparatus illustrated in the drawings. With reference particularly to FIG. 3, the apparatus is generally designated by the numeral 30 and includes a horizontally disposed substantially endless line conveyor 31 along the opposite sides of which are disposed a plurality of work stations indicated at 32, 33, 34 and 35, respectively. Provided at the several work stations are spray guns of the type illustrated in FIG. 10, each spray gun, however, being adapted for its particular purpose as will be more fully hereinafter disclosed. Also, the spray gun at each work station has associated therewith suitable heating devices that are adapted to condition the marginal edge portions of the glass sheets preparatory to or on completion of the spraying operation.

Generally stated, and with the conveyor 31 moving in the direction of the arrow indicated by numeral 37, a properly cleaned and inspected glass sheet 38 is carried forwardly toward the first station 32 at the entry end of which the proximate marginal edge portion of the sheet is initially conditioned in a heating zone by a so-called edge heater 40 (FIG. 11) in which the marginal edge portion is heated as rapidly as possible and the heating confined to a relatively narrow strip thereof to prevent warping and breaking of the glass. The edge heater is so controlled that when the glass sheet reaches and passes beneath the first spray gun 41 within the spray area the marginal edge portion is at a preselected temperature. Under most conditions, when passing beneath the spray gun 41, the temperature of the edge portion to be sprayed should be between 150° F. and 300° F.

As illustrated in FIG. 4, the marginal edge portion 44 of glass sheet 38 is provided with a metallic base coat in the form of a narrow strip or band 45 of a copper or copper alloy, as disclosed in the aforementioned Haven patent, No. 2,293,822. It has been found advantageous to direct the metal, in the form of a wire, through the spray gun 41 in which the wire is melted and the molten metal sprayed upon the glass. The temperature of the metal spray is preferably around 1200° to 1500° F., while the metallic coating on the glass is preferably about .0005 of an inch thick.

The coated glass sheet is then carried by the conveyor toward the first solder spray gun 46 but before reaching the gun the coated edge portion 44 is subjected to the action of flame burners 47 (FIG. 14) to remove the oxides that have been found to form by the exposure of the newly sprayed base coat to the air for even a relatively short period of time. This is accomplished by the use of a reducing flame, such as a properly controlled natural gas flame to satisfactorily reduce the oxides. The glass sheet is then carried beneath the spray gun 46 where an initial layer 49 of solder is sprayed on the copper base coat 45.

As shown in FIG. 5, the layer of solder 49 has a width slightly less than the width of the copper base coat 45 which results in an inwardly disposed narrow strip of exposed copper 50 for purposes to be hereinafter more fully explained. The initial layer of solder is applied to the copper base coat at a relatively high temperature ranging between 1000° to 1500° F. with the temperature of the glass being between 150° and 300° F. For example, a satisfactory coating may be obtained by spraying the solder at a temperature of 1200° F. onto a sheet at a temperature between 250° to 300° F. This results in the formation of a fine, dense coating which is about .0005 of an inch thick. The initial solder layer 49 readily and firmly bonds to the copper base coat 45 to provide a good receptive surface for a second and relatively heavy layer of solder which is sprayed onto the initial layer 49 in the second solder spraying area by a spray gun 52.

Figure 15:
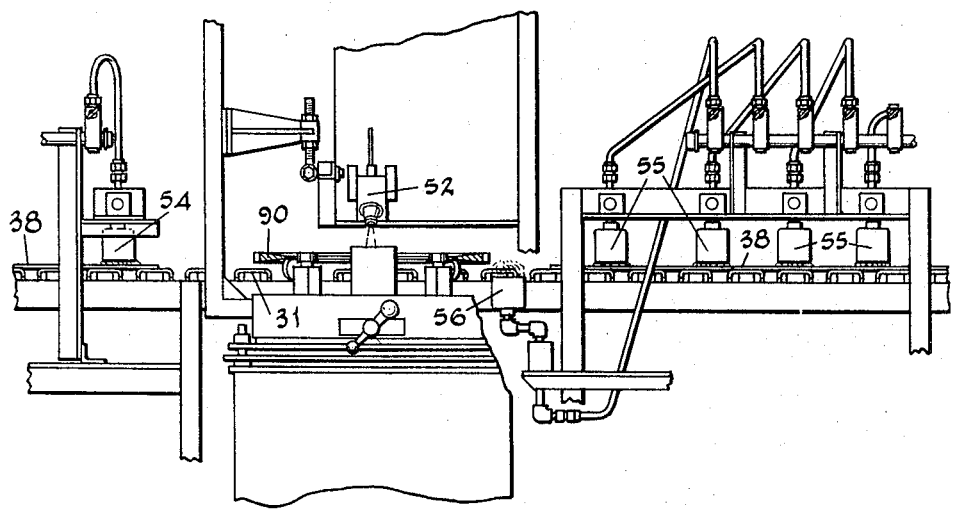
FIG. 15 is a front elevation of a second solder spray gun assembly.

Upon continued movement, the sheet is carried beneath the second solder spray gun 52 which applies a second and relatively thicker layer of solder 53 directly to the first layer of solder. This second layer of solder is applied at a relatively lower temperature ranging between 350° and 500° F. with the marginal edge portions of the sheet being between 150° and 300° F. To ensure that the marginal edge portion of the glass sheet is at the proper temperature upon reaching the second spray gun 52, it may be moved beneath a gas burner 54 (FIG. 15). Again by way of example, a satisfactory second layer may be obtained by spraying the solder at a temperature of 400° F. onto the sheet the temperature of which is between about 250° to 300° F. The second solder layer 53 preferably is of a thickness of about .0025 of an inch.

As the sheet leaves the area of the second solder spray, the marginal edge portion 44 of the sheet passes beneath a plurality of gas burners 55 (FIG. 15) which act to flow and smooth out the second solder layer 53 and effect the adherence and amalgamation thereof with the first solder layer 49. This is aided by the use of a gas burner 56, the flames of which are directed upwardly toward the under surface of the sheet to maintain an equallized heat condition in the marginal edge portion thereof. As shown in FIG. 6, the second layer of solder 53 is of the same width as the first layer of solder 49 so as to completely cover the first layer but not the inwardly disposed narrow strip 50 of the copper base coat.

As the glass sheet 38 passes out of the first work station 32, it is moved laterally on the conveyor 31 in the direction of the arrow designated by the numeral 58. This locates the oppositely disposed marginal edge portion 60 of the sheet in proper longitudinal alignment with the edge heater 40, and the spray guns 41, 46 and 52 of the second work station 33. Upon completion of movement of the glass sheet through the station 33, the marginal edge portion 60 thereof will have received in sequential order, a copper base coat 45, a first layer of solder 49 and a second layer of solder 53 as shown in FIGS. 4, 5 and 6 and described above in connection with the coating of the marginal edge portion 44.

After the glass sheet 38 has been moved out of the second work station 33 and preparatory to movement of the sheet through the third work station 34, it is turned bodily in the direction of the arrow designated by the numeral 63 through an arc of 90° to bring the marginal edge portion 64 of the third side of the glass sheet in longitudinal alignment with the edge heater 40 and spray guns 41, 46 and 52 of the third work station 34, which is on the same side of the conveyor 31 as work station 33. As the sheet then moves through work station 34 the marginal edge portion 64 is sequentially provided with the copper base coat 65 as illustrated in FIG. 7, the first solder layer 66 as in FIG. 8 and the second solder layer 67 as in FIG. 9.

With reference particularly to FIG. 7, it will be noted that when the copper allow is sprayed onto and along the marginal edge portion 64 of the sheet, the width of the resulting layer 65 will cover the endmost portions of the above described exposed copper strip 50 remaining along each of the marginal edge portions 44 and 64. This results in a copper base coat on the surface of the glass in an overlapping area as indicated by the numeral 68 in FIG. 7. It is important that the solder layers applied along the first two marginal edge portions of the sheet be of a relatively narrower width than the copper base coat since otherwise the complete application of the copper base coat to the glass sheet could not be achieved. The resulting overlay of the copper along the area 68 insures that the first solder layer 66 will be applied to the base coat 65 to adhere therewith between the inner edges of the final solder layers along marginal edge portions 44 and 60.

It will also be noted upon reference to FIG. 8 that the first layer of solder 66 is of substantially the same width as the copper base coat 65 so as to completely cover the same. Thus, the second solder layer 67 in FIG. 9 fully covers the solder layer 66 and, after passing beneath the heating devices 55 will afford a layer of solder along the marginal edge portion 64 while completing the union of the solder layer 67 with the solder layers 53 on the marginal edge portions 44 and 60 at the respective corners of the sheet.

The glass sheet 38 is now again moved laterally on the conveyor 31 as indicated by the arrow designated by the numeral 73 to locate the marginal edge portion 74 of the fourth side of sheet 38 in longitudinal alignment with the edge heater 40 and spray guns 41, 46 and 52 of fourth work station 35. As the sheet is carried through the work station 35, the marginal edge portion 74 will be provided with a copper base coat 65, a first solder layer 66 and second solder layer 67 in the same manner as the edge portion 64 described above and viewed in FIGS. 7, 8 and 9. This will complete the coating or metallizing of all four edge portions of the glass sheet after which the sheet is inspected and washed and is then ready for assembly with a similarly coated sheet into a multiple glass sheet glazing unit as shown in FIGS. 1 and 2.

An important advantage of the method provided by the present invention and described above, is that the initial solder layer can be applied directly to the copper base coat on the glass sheet without the necessity of first applying a flux to the copper base coat. Likewise, no fluxing material is required in applying the second solder layer to the first solder layer. Because of this, the disadvantages attendant with the use of a flux, as pointed out above, are obviated.

Briefly stated, the apparatus by which the improved method of this invention is carried out, may include the same type of heating devices and spray guns at each of the several work stations 32, 33, 34 and 35. Thus, the spray gun 80 illustrated in FIG. 10 can be said to be typical of the guns arranged in the copper spray area and in the first and second solder spray areas of each work station. The spray gun 80 is mounted upon an inclined base plate 81 carried by a horizontal bracket 82, secured to a vertically disposed column 83 mounted on a support table 84. By means of suitable links 85 and adjusting bolts 86, the base plate 81 can be adjusted to locate the gun 80 to direct the metallizing material at the desired angle with reference to the surface of the glass sheet 38. An angle of approximately 55° to the surface of the glass sheet has been found preferable. While the guns, indicated at 41, 46 and 52 in FIGS. 13, 14 and 15 are mounted to direct the metallizing material transversely to the movement of the glass sheet or substantially at a right angle to the longitudinal line of its movement, it is also contemplated that the guns may be disposed at an angle to the said longitudinal line of movement, preferably about 40°. According to this arrangement, the guns will be mounted to direct the metal spray at two different angles relative to the glass sheet, i.e. at an angle transversely of the line of movement of the sheet and at an angle in the direction of movement of the sheet.

The copper alloy wire 88 in one instance and a solder of the desired composition in wire form in the other instance, is supplied to the gun and fed therethrough in a conventional manner. When properly reduced to a molten condition within the gun, the copper or solder is directed toward the sheet in the form of a substantially conical spray 89.

In order that the coating formed on the marginal edge portion of the glass sheet will be restricted to a strip of predetermined width, a ring shield 90 is provided to cut off one portion of the spray while that portion of the spray passing beyond the edge of the sheet is received in a funnel 91 and suitably collected. This insures that the central and most dense portion of the spray strikes the glass. The deposit of copper and/or solder upon the glass is therefore not only controlled by the relative angle of the spray gun with respect to the glass sheet, speed of wire through the gun, and speed of movement of the sheet therebeneath but also by the ring shield 90.

The ring shield 90 is provided around its outer edge with gear teeth 92 adapted to mesh with a drive pinion 93 operated by a motor (not shown). The shield is also supported for rotary movement on rollers 94 and maintained in proper position by guide rollers 95 engaging the inner edge thereof. The rollers 94 and 95 are mounted on the table 83 by means of posts 96. The table 83 is supported on the framework 97 for vertical and transverse movement to properly position the spray gun 80 and shield 90 with respect to the edge of the glass sheet.

One form of sheet edge heating device, heretofore designated by the numeral 40, is shown in FIG. 11 and is employed at each of the work stations in advance of the respective spray gun 41. As herein shown, an electrical heating element 100 is arranged between spaced upper and lower insulated cover plates 101 located within a housing 102 carried by support rods 103. The number of heaters and the length of the heating device are dependent upon the speed of movement of the conveyor 31 and the exact operating temperatures desired. It is preferred, however, that the heating of the glass be done as rapidly as possible and confined to a relatively narrow strip at the edge of the glass sheet. As hereinabove indicated, this serves to confine the compressional strain to a narrow area and helps to prevent warping and breaking of the glass. As shown in FIG. 11, only the marginal edge portion of the glass sheet is received between the upper and lower cover plates 101 in relatively close proximity to the heating element 100.

The form of heating device 47 shown in FIGS. 12 and 14 is typical of those employed for heating the glass in advance of the solder spray guns. Each heating device includes a burner head 105 mounted on an adjacent column 106, or suitable bracket, and connected to a source of gas through pipe 107. The burner heads 105 are preferably of the internal combustion type having elongated, ceramic lined combustion chambers into which a controlled mixture of natural gas and air is introduced and burned to produce a flame of the desired characteristics.

It is to be understood that the form of the invention herewith described is to be taken as an illustrative embodiment only of the same, and that various procedural changes may be resorted to without departing from the spirit of the invention.

I claim:
1. A method of coating glass sheets for subsequent soldering operations, comprising moving a glass sheet to be coated along a definite path, heating the sheet to a preselected temperature ranging between about 150° and 300° F., spraying a molten metal alloy on the heated sheet as it moves along said path to form a metallic coating thereon, directing a reducing flame against said metallic coating to remove oxides therefrom, applying a first layer of solder directly on the metallic coating upon continued movement of the sheet along said path and while said sheet is at said elevated temperature by spraying molten solder at a temperature between about 1000° and 1500° F. to produce a fine, dense, relatively thin layer of solder on said metallic coating, and then applying a second layer of solder directly on the first layer of solder as the sheet moves along said path by spraying molten solder at a temperature between about 350° and 500° F. to produce a realtively thicker layer on said first layer of solder.

2. A method as defined in claim 1 in which said first layer of solder is reheated prior to spraying of the second layer of solder thereon to maintain the temperature of the glass between about 150° and 300° F.

3. A method as defined in claim 2, in which the first layer of solder is about .0005 of an inch thick and the second layer is about .0025 of an inch thick.

(References on following page)

References Cited by the Examiner

UNITED STATES PATENTS

| | | | |
|---|---|---|---|
| 2,235,680 | 3/1941 | Haven et al. | 161—45 |
| 2,235,681 | 3/1941 | Haven et al. | 161—45 |
| 2,938,494 | 5/1960 | Wampler et al. | 118—74 |

FOREIGN PATENTS 1,047,392  12/1958  Germany.

ALFRED L. LEAVITT, *Primary Examiner.*

JOSEPH B. SPENCER, *Examiner.*

J. R. BATTEN, Jr., *Assistant Examiner.*